US011645364B2

(12) United States Patent
Hu et al.

(10) Patent No.: US 11,645,364 B2
(45) Date of Patent: *May 9, 2023

(54) SYSTEMS AND METHODS FOR OBJECT DETECTION USING STEREOVISION INFORMATION

(71) Applicant: Argo AI, LLC, Pittsburgh, PA (US)

(72) Inventors: Xiaoyan Hu, Redmond, WA (US); Lingyuan Wang, Redwood City, CA (US); Michael Happold, Pittsburgh, PA (US); Jason Ziglar, Pittsburgh, PA (US)

(73) Assignee: argo ai, llc

( * ) Notice: Subject to any disclaimer, the term of this patent is extended or adjusted under 35 U.S.C. 154(b) by 0 days.

This patent is subject to a terminal disclaimer.

(21) Appl. No.: 17/816,750

(22) Filed: Aug. 2, 2022

(65) Prior Publication Data

US 2022/0374659 A1 Nov. 24, 2022

Related U.S. Application Data

(63) Continuation of application No. 17/118,705, filed on Dec. 11, 2020, now Pat. No. 11,443,147.

(51) Int. Cl.
*G06K 9/62* (2022.01)
*H04N 13/161* (2018.01)
(Continued)

(52) U.S. Cl.
CPC ......... *G06K 9/6265* (2013.01); *G06V 10/26* (2022.01); *G06V 10/462* (2022.01); *G06V 20/58* (2022.01); *H04N 13/161* (2018.05)

(58) Field of Classification Search
CPC .... G06K 9/6265; H04N 13/161; G06V 20/58; G06V 10/462; G06V 10/26
See application file for complete search history.

(56) References Cited

U.S. PATENT DOCUMENTS 9,235,781 B2 1/2016 Poole et al.
9,846,946 B2 12/2017 Fan et al.
(Continued)

FOREIGN PATENT DOCUMENTS

WO 2019223513 A1 11/2019

OTHER PUBLICATIONS

Schulter, S. et al., "Ordinal Random Forests for Object Detection," Institute for Computer Graphics and Vision Graz University of Technology, Austria.
(Continued)

*Primary Examiner* — David Perlman
(74) *Attorney, Agent, or Firm* — Fox Rothschild, LLP (57) ABSTRACT

Systems and methods for object detection. The methods comprise, by a computing device: obtaining a plurality of intensity values denoting at least a difference in a first location of at least one object in a first image and a second location of the at least one object in a second image; converting the intensity values to 3D position values; inputting the 3D position values into a classifier algorithm to obtain classifications for data points of a 3D point cloud (each of the classifications comprising a foreground classification or a background classification); and using the classifications to detect at least one object which is located in a foreground or a background.

18 Claims, 9 Drawing Sheets

(51) Int. Cl.
*G06V 10/26* (2022.01)
*G06V 10/46* (2022.01)
*G06V 20/58* (2022.01)

(56) References Cited

U.S. PATENT DOCUMENTS

| | | |
|---|---|---|
| 2005/0237385 A1* | 10/2005 | Kosaka ................ G01B 11/00 |
| | | 348/42 |
| 2006/0210117 A1 | 9/2006 | Chang et al. |
| 2012/0281907 A1 | 11/2012 | Samples et al. |
| 2018/0225866 A1* | 8/2018 | Zhang ..................... G06T 7/593 |
| 2018/0350087 A1 | 12/2018 | Kowdle et al. |
| 2019/0182467 A1 | 6/2019 | Hamilton |
| 2021/0082181 A1* | 3/2021 | Shi ......................... G06V 20/58 |
| 2021/0148722 A1* | 5/2021 | Ko ..................... G01C 21/3638 |

OTHER PUBLICATIONS

Liu, Z. et al., "Object Detection and Localization Using Randon Forest" abstract, https://ieeexplore.ieee.org/documents/6173391, Oct. 2020.
Random Forest for Stereo Segmentation.

\* cited by examiner

SYSTEMS AND METHODS FOR OBJECT DETECTION USING STEREOVISION INFORMATION

CROSS-REFERENCE AND CLAIM OF PRIORITY

This patent application is a Continuation of and claims priority to U.S. patent application Ser. No. 17/118,705 filed Dec. 11, 2020, which is incorporation herein by reference in its entirety.

BACKGROUND

Statement of the Technical Field

The present disclosure relates generally to object detection systems. More particularly, the present disclosure relates to implementing systems and methods for object detection using stereovision information.

Description of the Related Art

A stereo camera is a camera with two or more lenses for simulating human binocular vision. Computer stereovision is the extraction of 3D information from digital images captured by stereo cameras. By comparing information about a scene from two vantage points, 3D information can be extracted that defines a 3D point cloud forming a disparity image. The disparity image provides a 3D estimate of the environment along with co-registered intensity or color data. Objects can be detected from the disparity image. However, stereovision based object detection is a computationally expensive process.

SUMMARY

The present disclosure concerns implementing systems and methods for operating a vehicle. The methods comprise, by a processor: obtaining a pair of stereo images captured by a stereo camera; processing the pair of stereo images to generate a disparity map comprising a plurality of pixels defined by intensity values; converting each intensity value to a 3D position in a map (the 3D position defining a location of a data point in a point cloud); performing a hierarchical decision tree classification (e.g., a Random Forest classification) to determine a classification for each data point in the point cloud (the classification being a foreground classification or a background classification); and using the classifications to facilitate autonomous control of the vehicle. For example, the classification can be used to determine one or more predicated object trajectories, which may be used in a vehicle trajectory generation process and/or vehicle dynamics control process.

In some scenarios, the intensity value may be converted into the 3D position based on at least one of a known time of image capture, a known location of the vehicle at the time of image capture, known positions of the stereo cameras relative to the vehicle, known pixel pointing directions, and known distances of the pixels to the stereo cameras. Ground segmentation may be performed to reduce a total number of data points in the point cloud prior to performance of the hierarchical decision tree classification.

A delta value for each data point may be determined that represents a difference between a ground height value and a z-coordinate value partially defining a respective 3D position in the map. The hierarchical decision tree classification may be based on the delta value. The hierarchical decision tree classification may alternatively or additionally be based on at least one of the intensity value, the 3D position, a color value for a first pixel in the pair of stereo images, and at least one feature of a second pixel in the pair of stereo images. The second pixel may reside proximate to the first pixel in the pair of stereo images. The feature(s) of the second pixel may include, but is(are) not limited to, an intensity value, a 3D position, a color value, and a location of the second pixel relative to the first pixel in the pair of stereo images.

The hierarchical decision tree classification is facilitated by machine learned models that each operate using a set of decision trees. Each decision tree produces a class prediction for each data point in the point cloud and a confidence value for the class prediction. The class predictions produced by the decision trees in the set are respectively combined together to determine a final class prediction for each data point. The final class predictions may be determined using a weighted function in which the confidence values are used as weights.

The implementing systems comprise: a processor; and a non-transitory computer-readable storage medium comprising programming instructions that are configured to cause the processor to implement a method for operating a vehicle. The programming instructions comprise instructions to: obtain a pair of stereo images captured by a stereo camera; process the pair of images to generate a disparity map comprising a plurality of pixels defined by intensity values; convert each intensity value to a 3D position in a map (each 3D position defining a location of a data point in a point cloud); perform a hierarchical decision tree classification (e.g., a Random Forest classification) to determine a classification for each data point in the point cloud (the classification being a foreground classification or a background classification); and use the classifications to facilitate autonomous control of the vehicle.

In some scenarios, each intensity value is converted into the 3D position based on at least one of a known time of image capture, a known location of the vehicle at the time of image capture, known positions of the stereo cameras relative to the vehicle, known pixel pointing directions, and known distances of the pixels to the stereo cameras. The programming instructions may also comprise instructions to reduce a total number of data points in the point cloud based on ground height, prior to performance of the hierarchical decision tree classification.

The programming instructions may further comprise instructions to compute a delta value for each said data point that represents a difference between a ground height value and a z-coordinate value partially defining a respective 3D position in the map. The hierarchical decision tree classification may be based on the delta value. The hierarchical decision tree classification may additionally or alternatively be based on the intensity value, the 3D position, a color value for a first pixel in the pair of stereo images, and/or feature(s) of a second pixel in the pair of stereo images. The second pixel may reside proximate to the first pixel in the pair of stereo images. The feature(s) of the second pixel can include, but is(are) not limited to, an intensity value, a 3D position, a color value, and a location of the second pixel relative to the first pixel in the pair of stereo images.

The hierarchical decision tree classification is facilitated by machine learned models that each operate using a set of decision trees. Each decision tree produces a class prediction for each data point in said point cloud and a confidence value for the class prediction. The class predictions produced by the decision trees in the set are respectively combined together to determine a final class prediction for each said data point. The final class predictions may be determined using a weighted function in which the confidence values are used as weights.

The present document also concerns implementing systems and methods for object detection. The methods comprise performing the following operations by a computing device: obtaining a plurality of intensity values denoting at least a difference in a first location of at least one object in a first image and a second location of the at least one object in a second image; converting the intensity values to 3D position values; inputting the 3D position values into a classifier algorithm to obtain classifications for data points of a 3D point cloud, each of the classifications comprising a foreground classification or a background classification; and using the classifications to detect at least one object which is located in a foreground or a background.

The implementing systems can comprise: a processor; and a non-transitory computer-readable storage medium comprising programming instructions that are configured to cause the processor to implement a method for operating an automated system. The above-described methods can also be implemented by a computer program product comprising memory and programming instructions that are configured to cause a processor to perform operations.

BRIEF DESCRIPTION OF THE DRAWINGS

The present solution will be described with reference to the following drawing figures, in which like numerals represent like items throughout the figures.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

The term "object," when referring to an object that is detected by a vehicle perception system or simulated by a simulation system, is intended to encompass both stationary objects and moving (or potentially moving) actors, except where specifically stated otherwise by terms use of the term "actor" or "stationary object."

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The term "disparity" refers to the distance set. When disparity is determined for all pixels in the left and right image of a stereo image pair, the resulting data set may be referred to as a "disparity map" or a "disparity image". Recent deep learning-based stereo matching algorithms are capable of generating high quality disparity maps or images.

Computer stereovision provides disparity images representing a 3D estimate of the environment along with co-registered intensity or color data. Objects can be detected from the disparity images. However, stereovision based object detection is a computationally expensive process. The present solution addresses this drawback of conventional stereovision object detection techniques by implementing a segmentation algorithm for binary classification of a point cloud data points into foreground and background. The segmentation algorithm is compact, efficient and scalable. Given a stereo disparity map, camera pose and map tiles (Region of Interest (ROI) and ground height), an object classifier is trained to accurately and rapidly segment out pixels of interest (foreground) from background.

The present solution concerns implementing systems and methods for object detection using stereovision information. The methods generally involve converting or translating disparity image information (e.g., intensity values of a disparity image) to depth information using stereo extrinsics. For example, intensity values of a disparity image are converted or translated into depth values. A height of each depth value from the ground is estimated using information from a 3D map (e.g., a road map and/or a ground height map). The estimated height is input into a hierarchical decision tree classifier (e.g., a Random Forest classifier), which identifies pixels of a disparity image as either foreground or background. The manner in which the hierarchical decision tree classifier is novel and will become evident as the discussion progresses.

More specifically, the methods involve: obtaining stereo images, stereo instance labels, stereo image capture times, camera calibration data, and stereo camera poses; and identifying pairs of stereo images based on the stereo image capture times. A given pair includes two stereo images captured by a stereo camera at the same time. Disparity maps are then generated. A disparity map is an encoding of the apparent difference of the location (i.e., the shift) of an object in corresponding images of a stereo image pair. The encoding may measure differences between coordinates of corresponding pixels in the pair of stereo images. Thus, the disparity maps can be generated by determining apparent pixel position differences or motions between each pair of stereo images using any known or to be known algorithm (e.g., a triangulation based algorithm). Each disparity map includes a plurality of pixels each defined by an intensity value (scalar). The intensity value for each pixel of the disparity maps is projected into an xyz-position in a 3D road map using a known time of image capture (obtained from stereo image capture times), a known location of a vehicle at the time of image capture, known positions of the stereo cameras relative to the vehicle (obtained from stereo camera poses), known pixel pointing directions (obtained from camera calibration data), and/or known distances of the pixels from the stereo cameras (obtained from disparity maps). Operations are then performed to generate point cloud segments representing objects in a foreground or objects in a background using machine learned models of a hierarchical decision tree classifier. The machine learned models estimate foreground/background objects as a function of distances between data points.

The hierarchical decision tree classifier is trained using point clouds generated based on stereo images and the 3D road map (as described above) to determine a plurality of distances between data points in point clouds. Each distance comprises a distance between a given data point to each of a plurality of data points associated with nearby pixels in a stereo image plane. The distances are used by the hierarchical decision tree classifier to (i) detect patterns of distances between data points that are likely to indicate objects in the foreground or background, and (ii) determine how many nearby pixels are to be used to estimate foreground/background objects as a function of distance. The learned information (i) and (ii) is stored in a datastore as the machine learned models.

Notably, the present solution is described herein in the context of an autonomous vehicle. The present solution is not limited to autonomous vehicle applications. The present solution can be used in other applications such as robotic applications, metric applications and/or system performance applications.

Illustrative Vehicle Based Systems

The following discussion is provided to illustrate how the present solution can be used to facilitate control of a vehicle (e.g., for collision avoidance and/or autonomous driving purposes). The vehicle can include, but is not limited to, an autonomous vehicle.

Figure 1:
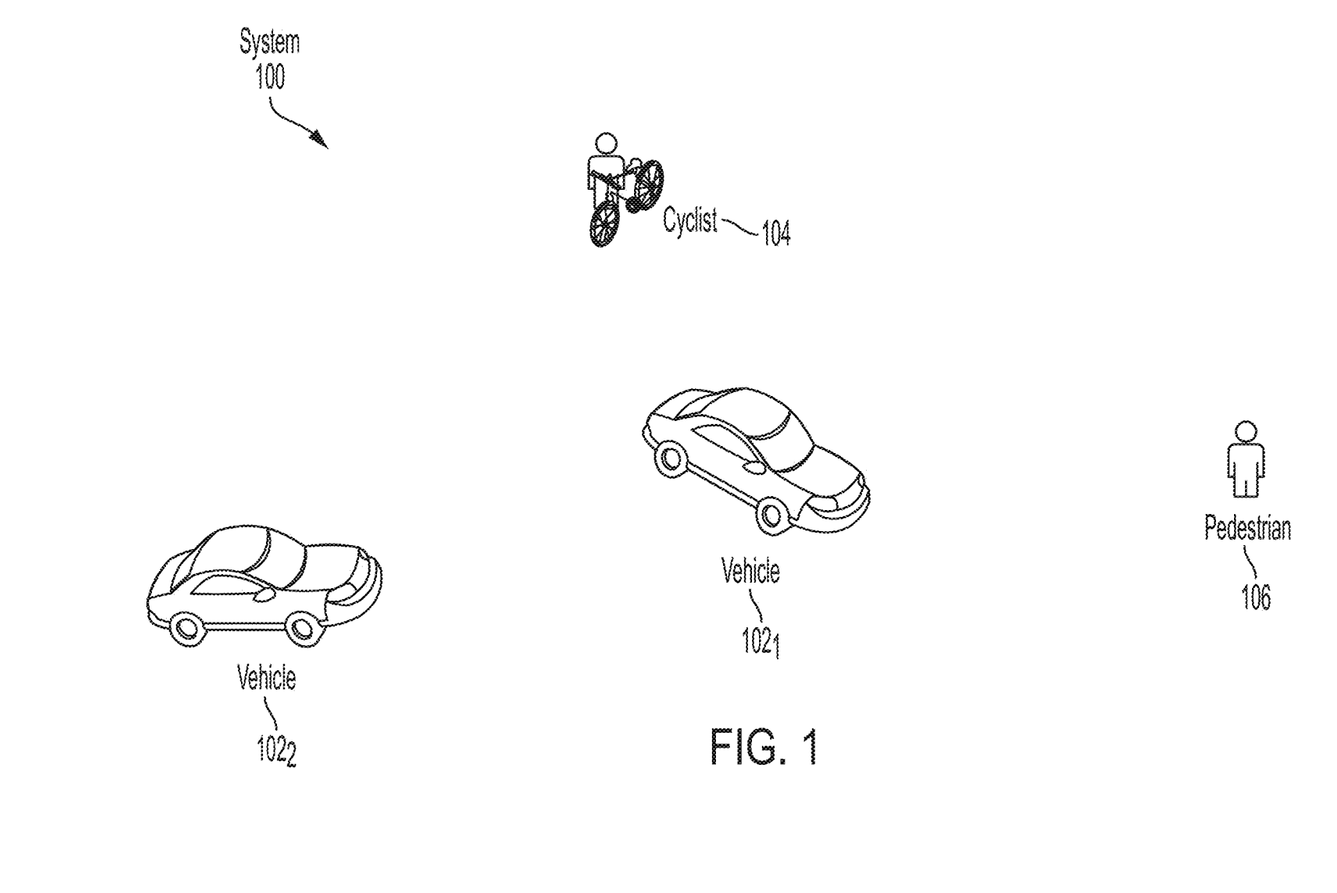
FIG. 1 provides an illustration of a system implementing the present solution.

Referring now to FIG. 1, there is provided an illustration of an illustrative system 100. System 100 comprises a vehicle $102_1$ that is traveling along a road in a semi-autonomous or autonomous manner. Vehicle $102_1$ is also referred to herein as an Autonomous Vehicle ("AV"). The AV $102_1$ can include, but is not limited to, a land vehicle, an aircraft, or a watercraft.

AV $102_1$ is generally configured to detect objects $102_2$, 104, 106 in proximity thereto. The objects can include, but are not limited to, a vehicle $102_2$, cyclist 104 (such as a rider of a bicycle, electric scooter, motorcycle, or the like) and/or a pedestrian 106. When such a detection is made, AV $102_1$ performs operations to: generate one or more possible object trajectories for the detected object; and analyze at least one of the generated possible object trajectories to determine a vehicle trajectory for AV $102_1$. The AV $102_1$ is then caused to follow the vehicle trajectory.

Figure 2:
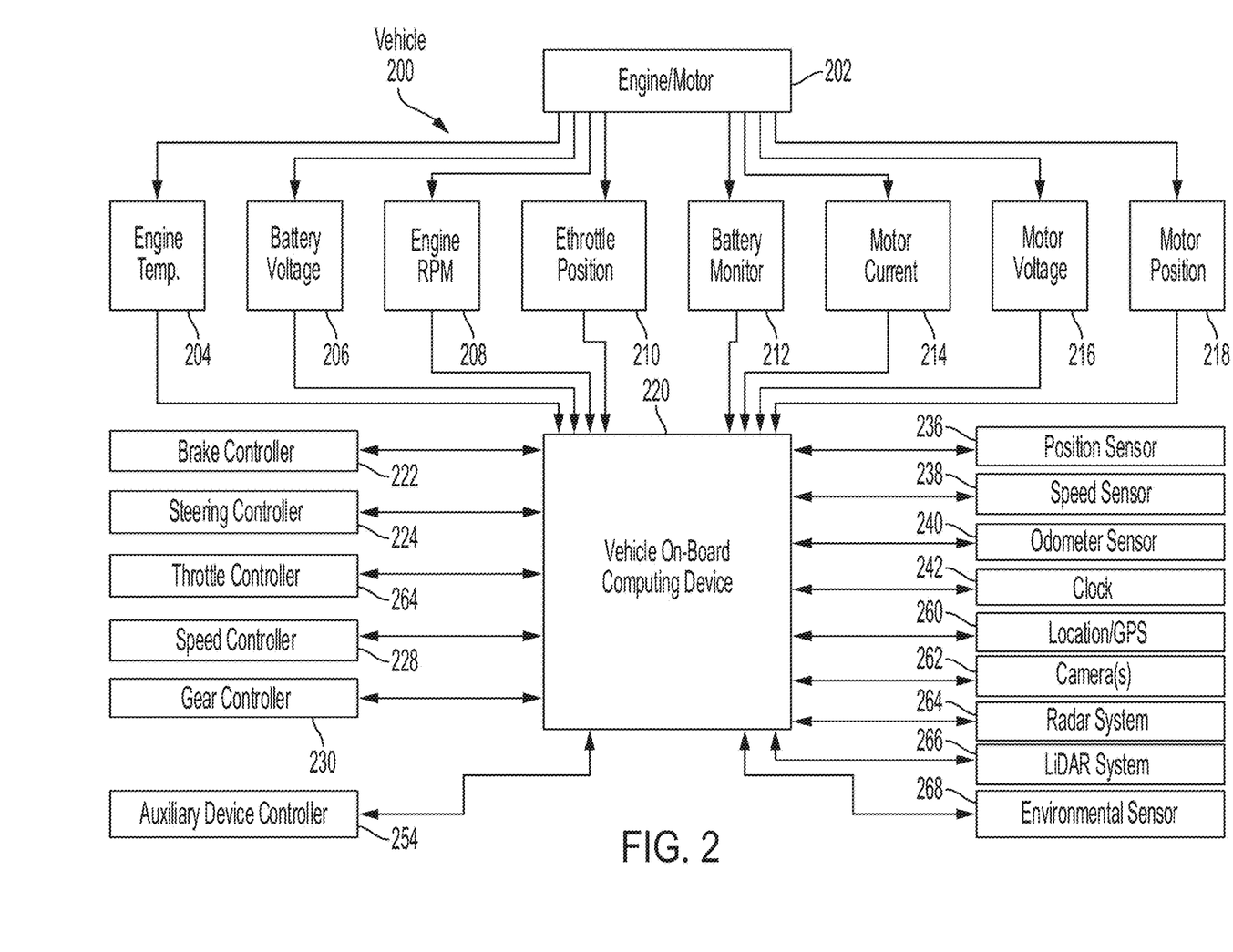
FIG. 2 is an illustration of an illustrative architecture for a vehicle.

Referring now to FIG. 2, there is provided an illustration of an illustrative system architecture 200 for a vehicle. Vehicles $102_1$ and/or $102_2$ of FIG. 1 can have the same or similar system architecture as that shown in FIG. 2. Thus, the following discussion of system architecture 200 is sufficient for understanding vehicle(s) $102_1$, $102_2$ of FIG. 1.

As shown in FIG. 2, the vehicle 200 includes an engine or motor 202 and various sensors 204-218 measuring various parameters of the vehicle. In gas-powered or hybrid vehicles having a fuel-powered engine, the sensors may include, for example, an engine temperature sensor 204, a battery voltage sensor 206, an engine Rotations Per Minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and temperature 216 sensors, and motor position sensors such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 260 (e.g., a Global Positioning System (GPS) device); object detection sensors such as one or more cameras 262; a LiDAR sensor system 266; and/or a radar system 264. The sensors also may include environmental sensors 268 such as a precipitation sensor and/or ambient temperature sensor. The camera(s) 262 can include, but is not limited to, stereo camera(s). The object detection sensors may enable the vehicle on-board computing device 220 to detect objects that are within a given distance range of the vehicle 200 in any direction, while the environmental sensors collect data about environmental conditions within the vehicle's area of travel.

During operations, information is communicated from the sensors to the on-board computing device 220. The on-board computing device 220 analyzes the data captured by the sensors, and optionally controls operations of the vehicle based on results of the analysis. For example, the on-board computing device 220 may control: braking via a brake controller 222; direction via a steering controller 224; speed and acceleration via a throttle controller 226 (in a gas-powered vehicle) or motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the camera(s) 262 and/or object detection information captured from sensors such as LiDAR is communicated to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

When such an object detection is made, the on-board computing device 220 performs operations to: generate one or more possible object trajectories for the detected object; and analyze at least one of the generated possible object trajectories to determine if there is a risk of a collision in a threshold period of time (e.g., 1 minute). If so, the on-board computing device 220 performs operations to determine whether the collision can be avoided if a given vehicle trajectory is followed by the vehicle 200 and any one of a plurality of dynamically generated emergency maneuvers is performed in a pre-defined time period (e.g., N milliseconds). If the collision can be avoided, then the on-board computing device 220 takes no action to change the vehicle trajectory or optionally causes the vehicle 200 to perform a cautious maneuver (e.g., mildly slows down). In contrast, if the collision cannot be avoided, then the on-board computing device 220 causes the vehicle 200 to immediately take an emergency maneuver (e.g., brakes and/or changes direction of travel).

Figure 3:
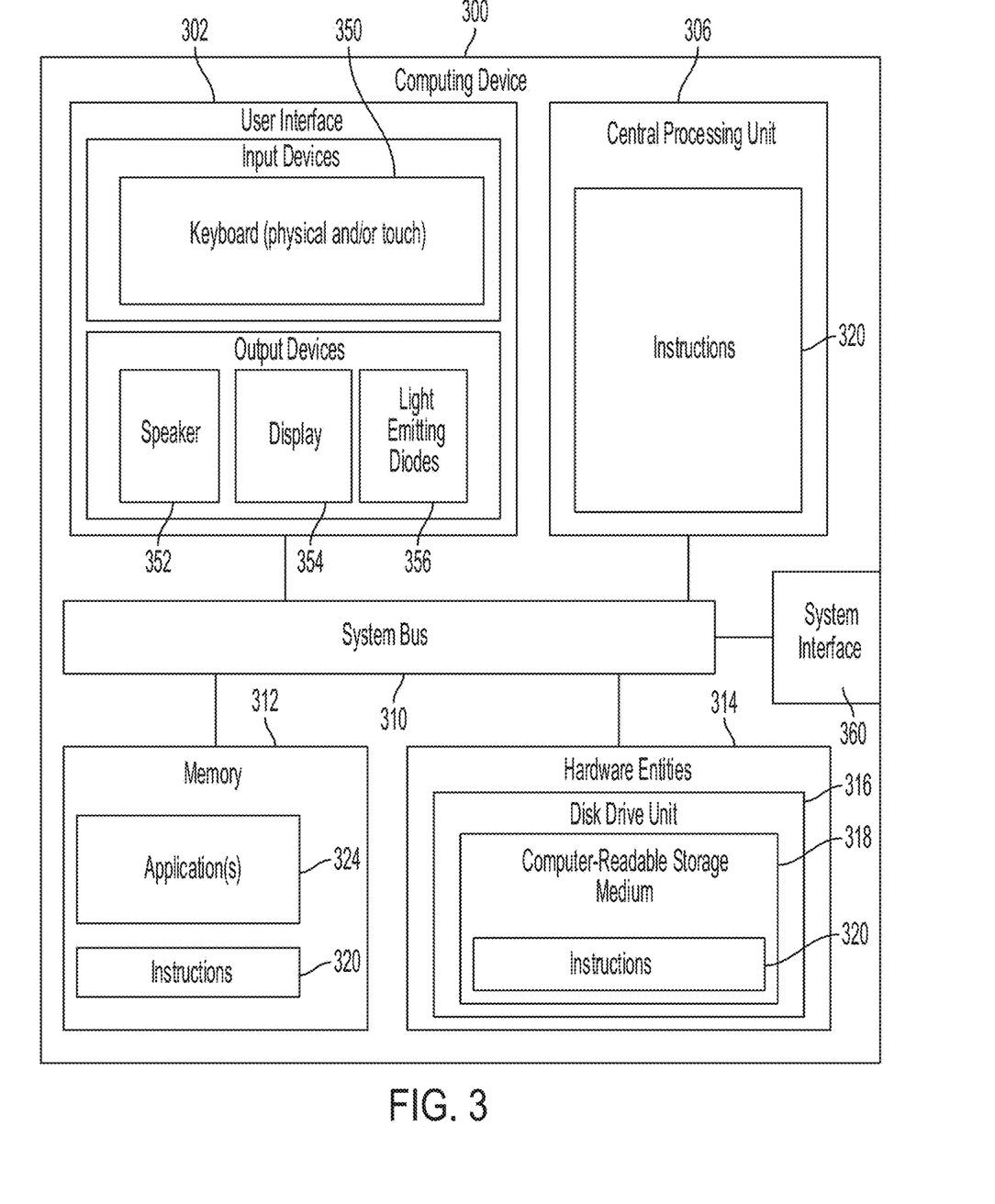
FIG. 3 is an illustration of an illustrative computing device.

Referring now to FIG. 3, there is provided an illustration of an illustrative architecture for a computing device 300. The vehicle on-board computing device 220 of FIG. 2 is at least partially the same as or similar to computing device 300. As such, the discussion of computing device 300 is sufficient for understanding the vehicle on-board computing device 220 of FIG. 2.

Computing device 300 may include more or less components than those shown in FIG. 3. However, the components shown are sufficient to disclose an illustrative solution implementing the present solution. The hardware architecture of FIG. 3 represents one implementation of a representative computing device configured to operate a vehicle, as described herein. As such, the computing device 300 of FIG. 3 implements at least a portion of the method(s) described herein.

Some or all components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit (CPU) 306, a system bus 310, a memory 312 connected to and accessible by other portions of computing device 300 through system bus 310, a system interface 360, and hardware entities 314 connected to system bus 310. The user interface can include input devices and output devices, which facilitate user-software interactions for controlling operations of the computing device 300. The input devices include, but are not limited to, a physical and/or touch keyboard 350. The input devices can be connected to the computing device 300 via a wired or wireless connection (e.g., a Bluetooth® connection). The output devices include, but are not limited to, a speaker 352, a display 354, and/or light emitting diodes 356. System interface 360 is configured to facilitate wired or wireless communications to and from external devices (e.g., network nodes such as access points, etc.).

At least some of the hardware entities 314 perform actions involving access to and use of memory 312, which can be a Random Access Memory (RAM), a disk drive, flash memory, a Compact Disc Read Only Memory (CD-ROM) and/or another hardware device that is capable of storing instructions and data. Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

Figure 4:
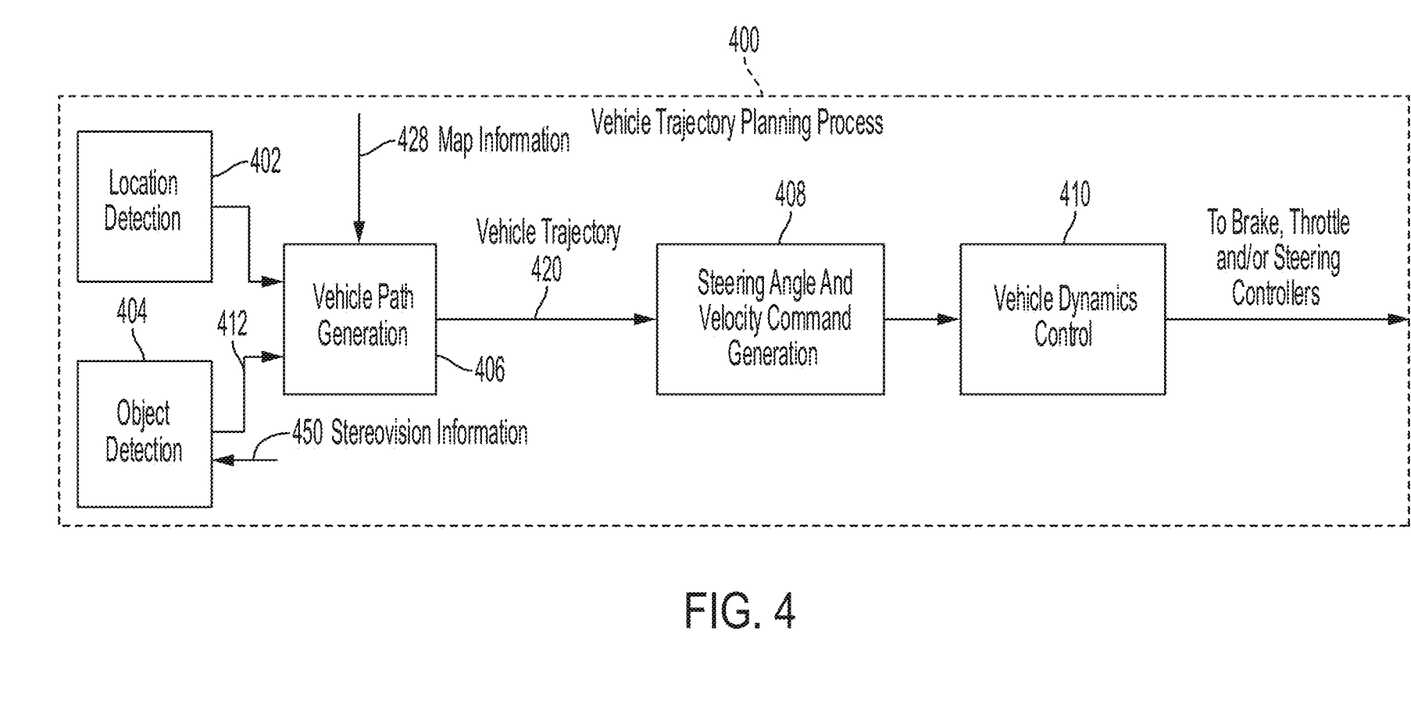
FIG. 4 provides a block diagram that is useful for understanding how control of a vehicle is achieved in accordance with the present solution.

Referring now to FIG. 4, there is provided a block diagram that is useful for understanding how vehicle control is achieved in accordance with the present solution. All of the operations performed in blocks 402-410 can be performed by the on-board computing device (e.g., vehicle on-board computing device 220 of FIG. 2) of a vehicle (e.g., AV $102_1$ of FIG. 1).

In block 402, a location of the vehicle is detected. This detection can be made based on sensor data output from a location sensor (e.g., location sensor 260 of FIG. 2) of the vehicle. This sensor data can include, but is not limited to, GPS data. The detected location of the vehicle is then passed to block 406.

In block 404, an object is detected within proximity of the vehicle. This object detection is made based on sensor data output from camera(s) (e.g., camera 762 of FIG. 7), a radar system (e.g., radar system 264 of FIG. 2), a LiDAR sensor system (e.g., a LiDAR system 266 of FIG. 2) of the vehicle. The camera(s) can include, but is(are) not limited to, stereo camera(s). The stereo cameras generated digital images which are processed by the on-board computing device (e.g., vehicle on-board computing device 220 of FIG. 2) to generate stereovision information 450. The stereovision information 450 includes, but is not limited to, 3D information extracted from the digital images captured by the stereo cameras. By comparing information about a scene from two vantage points, 3D information can be extracted that defines a 3D point cloud forming a disparity map or image. The disparity map or image provides a 3D estimate of the environment along with co-registered intensity or color data. The sensor data is also used to determine one or more possible object trajectories for the detected object(s) of interest, and/or an object classification (e.g., a pedestrian, a vehicle, a cyclist, etc.). An object of interest can include, but is not limited to, an object that is represented by data points in the 3D point cloud which are classified as foreground data points (rather than background data points) and/or a point cloud segment including data points classified as foreground data points (rather than background data points). The possible object trajectories can include, but are not limited to, the following trajectories:

- a trajectory defined by the object's actual speed (e.g., 1 mile per hour) and actual direction of travel (e.g., west);
- a trajectory defined by the object's actual speed (e.g., 1 mile per hour) and another possible direction of travel (e.g., south, south-west, or X (e.g., 40°) degrees from the object's actual direction of travel in a direction towards the AV) for the object;
- a trajectory defined by another possible speed for the object (e.g., 2-10 miles per hour) and the object's actual direction of travel (e.g., west); and/or
- a trajectory defined by another possible speed for the object (e.g., 2-10 miles per hour) and another possible direction of travel (e.g., south, south-west, or X (e.g., 40°) degrees from the object's actual direction of travel in a direction towards the AV) for the object.

The one or more possible object trajectories 412 and/or object classifications is(are) then passed to block 406.

In block 406, a vehicle trajectory 420 is generated using the information from blocks 402 and 404. Techniques for determining a vehicle trajectory are well known in the art. Any known or to be known technique for determining a vehicle trajectory can be used herein without limitation. In some scenarios, the vehicle trajectory 420 is determined based on the location information from block 402, the object detection/classification/trajectory information from block 404, and map information 428 (which is pre-stored in a data store of the vehicle). The map information 428 can include, but is not limited to, a 3D road map. The vehicle trajectory 420 represents a smooth path that does not have abrupt changes that would otherwise provide passenger discomfort. The vehicle trajectory 420 is then provided to block 408.

In block 408, a steering angle and velocity command is generated based on the vehicle trajectory 420. The steering angle and velocity command is provided to block 410 for vehicle dynamics control. The vehicle dynamics control cause the vehicle to decelerate, cause the vehicle to accelerate, and/or cause the vehicle to change its direction of travel.

Figure 5:
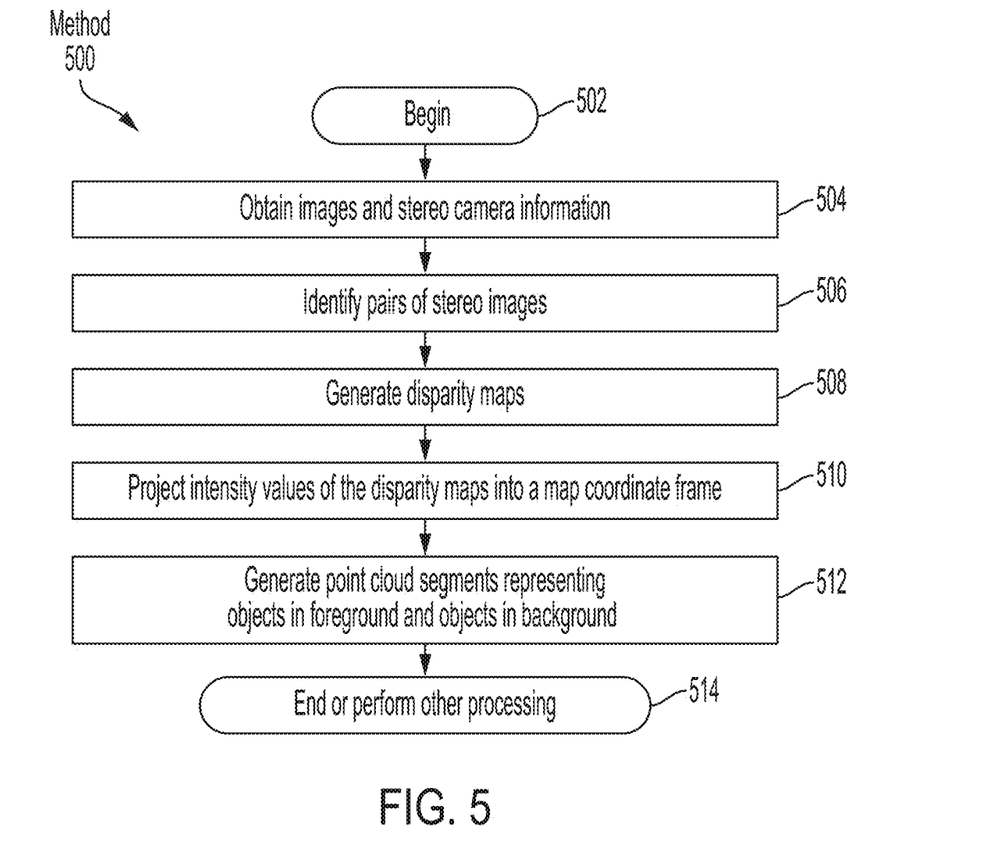
FIG. 5 provides a flow diagram of an illustrative method for foreground/background classification using stereovision information.

Referring now to FIG. 5, there is provided a flow diagram of an illustrative method 500 for foreground/background classification using stereovision information. Method 500 can be performed in block 404 of FIG. 4, by the vehicle on-board computing device 220 of FIG. 2, and/or computing device 300 of FIG. 3.

As shown in FIG. 5, method 500 begins with 502 and continues with 504 where a computing device (e.g., vehicle on-board computing device 220 of FIG. 2 and/or computing device 300 of FIG. 3) performs operations to obtain stereo images, stereo instance labels, stereo image capture times, camera calibration data, and/or stereo camera poses from a datastore (e.g., memory 312 of FIG. 3). The stereo images comprise digital images captured by one or more rectified stereo cameras (e.g., cameras 262 of FIG. 2), where the rectification process adjusts captured images such that the epipolar lines are collinear. The stereo instance labels can include, but are not limited to, information identifying stereo images. The stereo image capture times can include, but are not limited to, timestamps specifying times at which images where captured by stereo cameras. The camera calibration data can include, but is not limited to, information about a precise position of the right and left cameras and optical characteristics of the left and right cameras. A stereo camera pose includes, but is not limited to, a camera's orientation and/or a camera's position with respect to an object (e.g., a vehicle).

Figure 6:
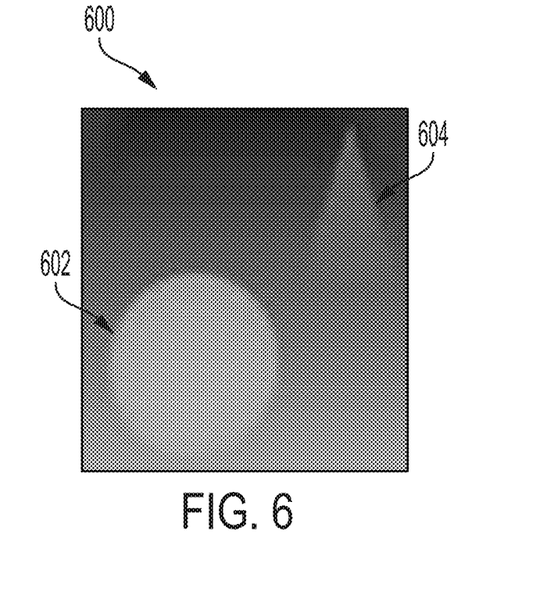
FIG. 6 provides an illustration of an illustrative disparity map.

Next in 506, the computing device performs operations to identify pairs of stereo images based on the stereo image capture times. A given pair includes two stereo images taken by two stereo cameras (e.g., a right camera and a left camera) at the same time. The computing device also performs operations in 508 to generate disparity maps. Each disparity map illustrates an apparent pixel position difference or motion between a pair of stereo images. The disparity map is an encoding of the apparent difference of the location (i.e., the shift) of an object in corresponding images of a stereo image pair. The encoding may measure differences between coordinates of corresponding pixels in the pair of stereo images. Thus, a disparity map can be generated by determining apparent pixel position differences or motions between each pair of stereo images using any known or to be known algorithm (e.g., a triangulation based algorithm). Each disparity map includes a plurality of pixels each defined by an intensity value (scalar). In some scenarios, each pixel can have an intensity value from 0 to 255 associated therewith. An illustrative disparity map 600 is provided in FIG. 6. As shown in FIG. 6, an object 602 in the foreground is brighter than the object 604 in the background. Brightness denotes an amount of motion and an amount of distance from a stereo camera. For example, the brightness of object 602 denotes that the object has greater motion as compared to object 604 and that the object is closer to the stereo camera than object 604. The present solution is not limited in this regard.

Once the disparity maps have been generated, the computing device performs operations in 510 to project the intensity value for each pixel in the disparity map(s) into a map coordinate frame. This projection is achieved by converting the intensity value to a 3D position in a map (e.g., a road map). The 3D position defines a location of a data point in a point cloud. Thus, each projected intensity value comprises a 3D position in a map (e.g., a road map). The 3D position is defined by an x-coordinate X, a y-coordinate Y, and a z-coordinate Z. This projection is achieved using a known time of image capture t (obtained from stereo image capture times), a known location of a vehicle at the time of image capture $l_t$, known positions of the stereo cameras relative to the vehicle p1, p2 (obtained from stereo camera poses), known pixel pointing directions $\alpha_n$ (obtained from camera calibration data), and known distances of the pixels from the stereo cameras $d_n$ (obtained from disparity maps).

In some scenarios, this projection is achieved using the back-projection process described in U.S. patent Ser. No. 16/802,970. The back projection process is generally defined by the following mathematical equation (1).

$$[XYZ]=\text{inv}(K)*\text{depth}*[x\,y1], \quad (1)$$

where inv(K) is an inverse matrix of K, x represents an x-coordinate of a pixel in a disparity map, and y represents a y-coordinate of the pixel in the disparity map. K is defined by the following mathematical equation (2).

$$K=[\text{focal\_length } 0;cx\ 0\text{ focal\_length } cy;001] \quad (2)$$

Where K is a 3×3 matrix, cx and cy are pixel coordinates of a center of a left camera in a stereo camera system and focal_length is a characteristic of the left camera's optical system (assuming square pixels, otherwise two different focal length numbers are needed). depth is defined by the following mathematical equation (3).

$$\text{depth}=\text{baseline}*\text{focal\_length}/d_n \quad (3)$$

where baseline is a measure of a distance between the centers of the left and right cameras in a stereo camera system.

Next in 512, the data points in the point cloud are grouped together to define one or more point cloud segments for each detected object in the foreground and background. In some scenarios, ground segmentation is employed to reduce the total number of data points for further processing. The ground segmentation can involve: comparing a value of a z-coordinate Z for each data point to a minimum height threshold value $\text{thr}_{min\text{-}height}$ above ground and a maximum height threshold value $\text{thr}_{max\text{-}height}$ above ground; and discarding the data points with z-coordinate values that are less than $\text{thr}_{min\text{-}height}$ and greater than $\text{thr}_{max\text{-}height}$.

Additionally or alternatively, a delta value Δ is computed for each data point. The delta value Δ represents a difference between a ground height value $h_{ground}$ and the value of the z-coordinate Z for the given data point. Thus, the delta value can be defined by the following mathematical equation (4).

$$\Delta=Z-h_{ground} \quad (4)$$

The data values are then used as inputs to a hierarchical decision tree classifier (e.g., a Random Forest classifier). The hierarchical decision tree classifier can be implemented by the vehicle on-board computing device 220 of FIG. 2 and/or the computing device 300 of FIG. 3.

Other information input into the hierarchical decision tree classifier includes, but is not limited to, the following information for each data point: intensity values; X, Y and Z values for the data point; a color value for a corresponding pixel in each stereo image of a pair; and/or features of pixels that reside in proximity to the corresponding pixel in each stereo image of a pair. The definition of proximity can be pre-defined, for example, such that a pixel constitutes a proximate pixel to a corresponding pixel if the pixel resides less than N pixels away from the corresponding pixel in any direction. N is an integer equal to or greater than zero. The proximate pixel features include, but are not limited to: intensity values; X, Y and Z values for each data point associated with a proximate pixel; color values for the proximate pixels; and/or relative locations of the proximate pixels to each other and/or the pixel associated with the given data point.

Next, a hierarchical decision tree classifier uses the input data to (i) classify each data point as a foreground data point or a background data point and/or (ii) group the data points into point cloud segments for detected foreground object(s) and detected background object(s).

The hierarchical decision tree classifier classifies data points as foreground data points and background data points as functions of intensity values, delta values Δ (i.e., data point heights above ground), distances between data points, pixel colors, and/or relative locations of pixels. In this regard, the hierarchical decision tree classifier employs machine learned models that each operate using a set of decision trees. Each decision tree is configured to make class predictions for the data points. The decision trees operate as an ensemble. Each decision tree produces a class prediction for each data point. The class prediction specifies a foreground classification or a background classification, as well as a confidence value for such foreground/background classification. The results of the decision trees are combined together to determine a final classification for the given data point.

Figure 7A:
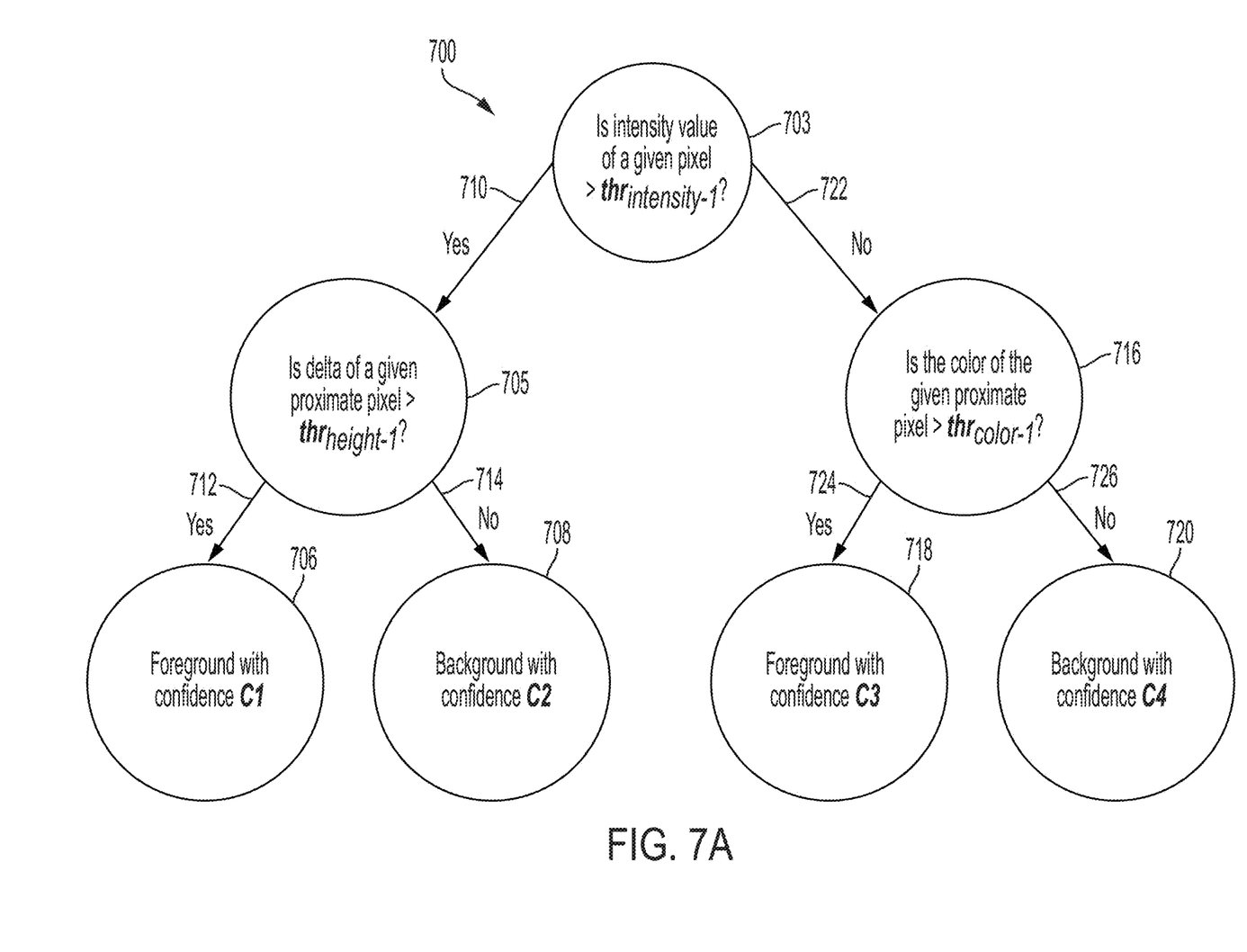
FIGS. 7A-7C (collectively referred to herein as "FIG. 7") provide illustrations of illustrative decision trees for a hierarchical decision tree classifier (e.g., a Random Forest classifier).
Figure 7B:
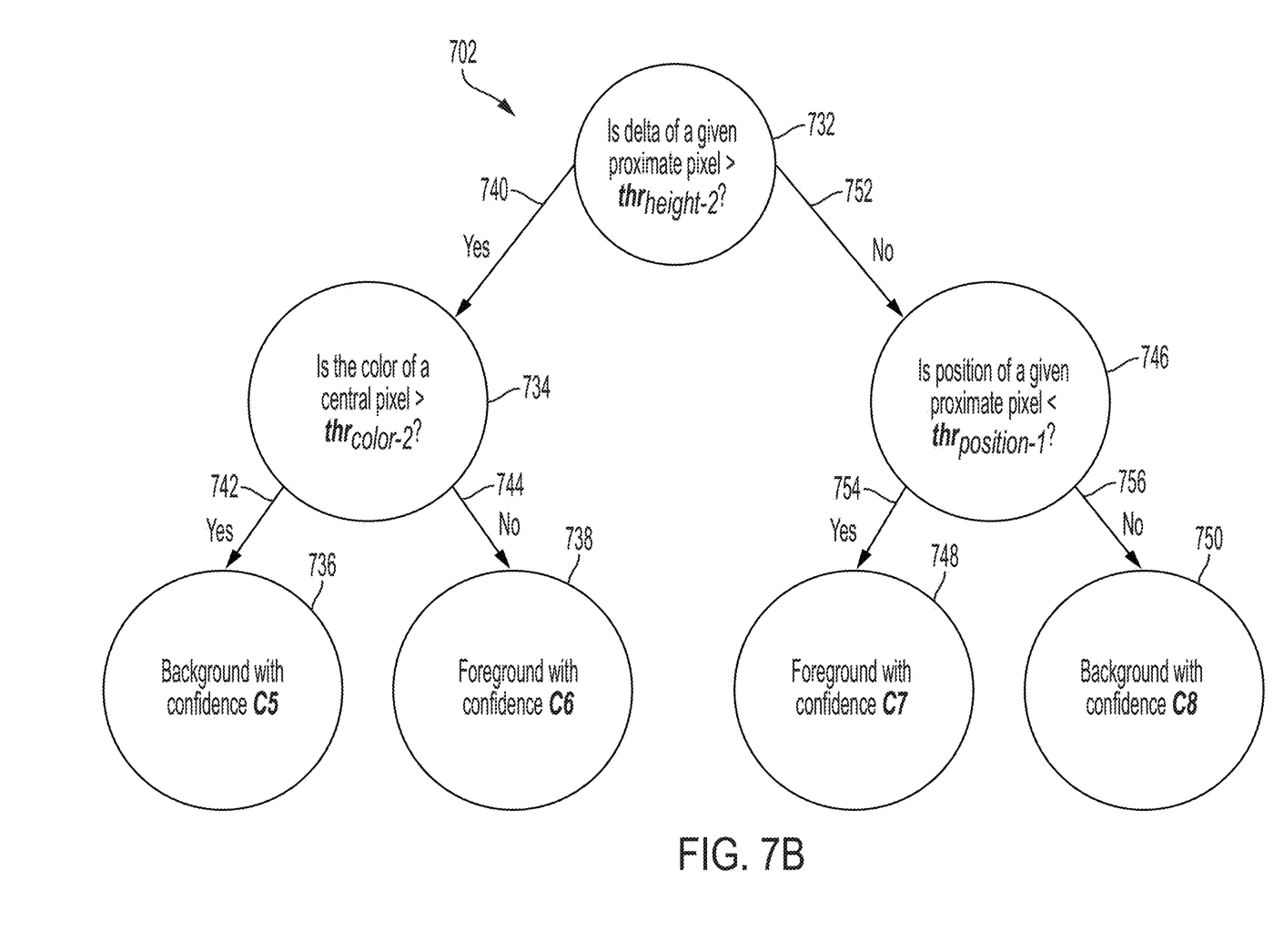
Figure 7C:
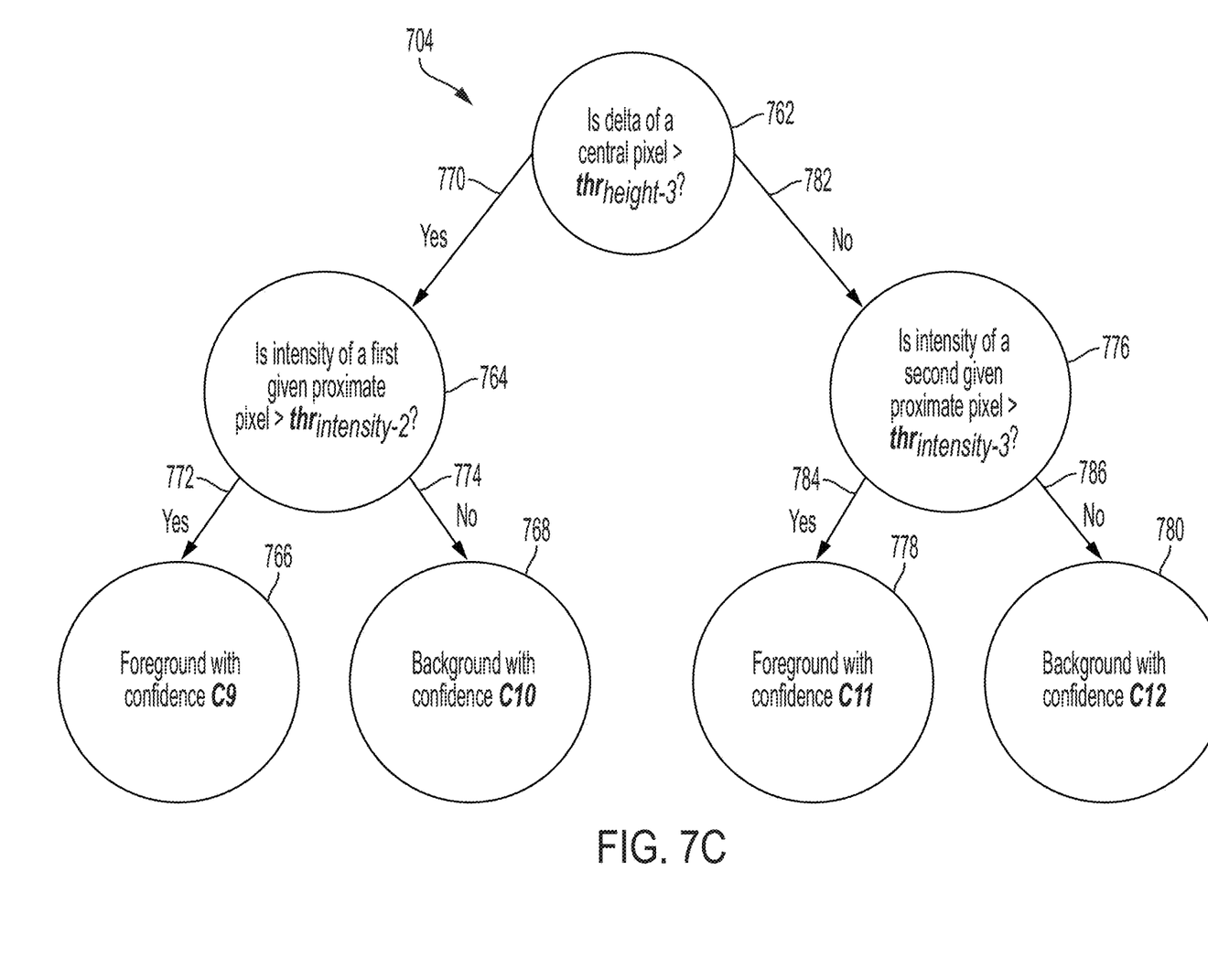

Referring now to FIG. 7, an illustrative set of decision trees 700, 702, 704 is provided that is employed by the hierarchical decision tree classifier in some scenarios. A first decision tree 700 is shown in FIG. 7A. A second decision tree 702 is shown in FIG. 7B. A third decision tree 704 is shown in FIG. 7C. Each decision tree comprises a root node, leaf nodes and branches. The root node is the topmost node. Each root node and intermediate (or inner) leaf node denotes a test on an attribute and each branch denotes the outcome of the test. The decision tree is constructed in a top-down recursive manner. The outcome of the bottom most node of each branch provides a prediction that the data point is associated with an object in the foreground or an object in the background. A confidence value Ci is also provided with the prediction. The confidence value Ci for each prediction can be predefined or dynamically computed in accordance with a given application. For example, the confidence score Ci can be defined as a function of intensity value(s), delta value(s), distance(s) between data points, pixel color(s) and/or relative locations of pixels.

As shown in FIG. 7A, the first decision tree 700 comprises a root node 703, leaf nodes 705, 706, 708, 716, 718, 720, and branches 710, 712, 714, 722, 724, 726. The root node 703 denotes a test for determining whether an intensity value of a given pixel is greater than a threshold value $\text{thr}_{intensity}$-1. The given pixel may comprise the pixel associated with the data point currently being considered for foreground/background prediction purposes. Branch 710 denotes an outcome that the intensity value of the given pixel is greater than the threshold value $\text{thr}_{intensity}$-1. Branch 722 denotes an outcome that the intensity value of the given pixel is not greater than the threshold value $\text{thr}_{intensity}$-1.

Intermediate (or inner) leaf node 705 denotes a test for determining whether the delta value Δ of a given proximate pixel is greater than a threshold value $\text{thr}_{height}$-1. The given proximate pixel can be a pixel that is adjacent to the given pixel in a certain direction (e.g., up, down, left, right) or a pixel that is W pixels removed from the given pixel in the certain direction (e.g., 2 pixels to the left of the given pixel). W is an integer. Branch 712 denotes an outcome that delta of the given proximate pixel is greater than the threshold value $thr_{height}-1$. Branch 712 leads to bottom leaf node 706 in which a prediction is made that the data point under consideration is associated with a foreground object with a degree of confidence C1. Branch 714 denotes an outcome that delta of the given proximate pixel is not greater than the threshold value $thr_{height}-1$. Branch 714 leads to bottom leaf node 708 in which a prediction is made that the data point under consideration is associated with a background object with a degree of confidence C2.

Intermediate (or inner) left node 716 denotes a test for determining whether the color of the given proximate pixel is greater than a threshold value $thr_{color}-1$. Branch 724 denotes an outcome that the color of the given proximate pixel is greater than the threshold value $thr_{color}-1$. Branch 724 leads to bottom leaf node 718 in which a prediction is made that the data point under consideration is associated with a foreground object with a degree of confidence C3. Branch 726 denotes an outcome that the color of the given proximate pixel is not greater than the threshold value $thr_{color}-1$. Branch 726 leads to bottom leaf node 720 in which a prediction is made that the data point under consideration is associated with a background object with a degree of confidence C4. The confidence values C1, C2, C3 and/or C4 can be the same as each other or different from each other.

When the decision tree 700 provides a prediction that the data point under consideration is associated with a foreground object, a value of a parameter $P_{700}$ may be set to first number (e.g., one). In contrast, the value of $P_{700}$ may be set to a second different number (e.g., zero) when the decision tree 700 provides a prediction that the data point under consideration is associated with a background object. The confidence value C1, C2, C3 or C4 and the value of parameter $P_{700}$ will subsequently be used by the system to make a final decision as to whether the data point under consideration is associated with a foreground object or a background object. The manner in which the final decision is made will become evident as the discussion progresses.

As shown in FIG. 7B, the second decision tree 702 comprises a root node 732, lead nodes 734, 736, 738, 746, 748, 750, and branches 740, 742, 744, 752, 754, 756. The root node 732 denotes a test for determining whether the delta value Δ of a given proximate pixel is greater than a threshold value $thr_{height-2}$. The threshold values $thr_{height-1}$ and $thr_{height-2}$ can be the same or different. Branch 740 denotes an outcome that the delta value Δ of the given proximate pixel is greater than the threshold value $thr_{height-2}$. Branch 752 denotes an outcome that the delta value Δ of the given proximate pixel is not greater than the threshold value $thr_{height-2}$. The proximate pixel considered in decision tree 702 can be the same or different than the proximate pixel considered in decision tree 700. For example, the proximate pixel referenced in decision tree 700 may comprise a pixel that is two pixels to the left of the pixel associated with the data point currently under consideration. The proximate pixel referenced in decision tree 702 may comprise a pixel that is five pixels above the pixel associated with the data point currently under consideration. The present solution is not limited to the particulars of this example.

Intermediate (or inner) leaf node 734 denotes a test for determining whether the color of a central pixel is greater than a threshold value $thr_{color-2}$. The threshold values $thr_{color-1}$ and $thr_{color-2}$ can be the same or different. The central pixel can be a pixel that is the center pixel of an image or a center pixel of a group of pixels containing the pixel that is associated with the data point currently under consideration. Branch 742 denotes an outcome that color of the central pixel is greater than the threshold value $thr_{color-2}$. Branch 742 leads to bottom leaf node 736 in which a prediction is made that the data point under consideration is associated with a background object with a degree of confidence C5. Branch 744 denotes an outcome that color of the central pixel is not greater than the threshold value $thr_{color-2}$. Branch 744 leads to bottom leaf node 738 in which a prediction is made that the data point under consideration is associated with a foreground object with a degree of confidence C6.

Intermediate (or inner) leaf node 746 denotes a test for determining whether the position of a given proximate pixel is less than a threshold value $thr_{position}-1$. The proximate pixel referenced in leaf node 746 can be the proximate pixel referenced in root node 732 or a different proximate pixel. Branch 754 denotes an outcome that the position of the given proximate pixel is less than the threshold value $thr_{position}-1$. Branch 754 leads to bottom leaf node 748 in which a prediction is made that the data point under consideration is associated with a foreground object with a degree of confidence C7. Branch 756 denotes an outcome that the position of the given proximate pixel is greater than the threshold value $thr_{position}-1$. Branch 756 leads to bottom leaf node 750 in which a prediction is made that the data point under consideration is associated with a background object with a degree of confidence C8. The confidence values C5, C6, C7 and/or C8 can be the same as each other or different from each other.

When the decision tree 702 provides a prediction that the data point under consideration is associated with a foreground object, a value of a parameter $P_{702}$ may be set to first number (e.g., one). In contrast, the value of $P_{702}$ may be set to a second different number (e.g., zero) when the decision tree 702 provides a prediction that the data point under consideration is associated with a background object. The confidence value C5, C6, C7 or C8 and the value of parameter $P_{702}$ will subsequently be used by the system to make a final decision as to whether the data point under consideration is associated with a foreground object or a background object. The manner in which the final decision is made will become evident as the discussion progresses.

As shown in FIG. 7C, the third decision tree 704 comprises a root node 762, leaf nodes 764, 766, 768, 776, 778, 780, and branches 770, 772, 774, 782, 784, 786. The root node 762 denotes a test for determining whether the delta value Δ of a central pixel is greater than a threshold value $thr_{height-3}$. The threshold values $thr_{height-1}$, $thr_{height-2}$ and/or $thr_{height-3}$ can be the same or different. Branch 770 denotes an outcome that the delta value Δ of the central pixel is greater than the threshold value $thr_{height-3}$. Branch 770 leads to intermediate (or inner) leaf node 764. Branch 782 denotes an outcome that the delta value Δ of the central pixel is not greater than the threshold value $thr_{height-3}$. Branch 782 leads to intermediate (or inner) leaf node 776.

Intermediate (or inner) leaf node 764 denotes a test for determining whether the intensity value of a first given proximate pixel is greater than a threshold value $thr_{intensity-2}$. The threshold values $thr_{intensity-1}$ and $thr_{intensity-2}$ can be the same or different. Branch 772 denotes an outcome that intensity value of the first given proximate pixel is greater than the threshold value $thr_{intensity-2}$. Branch 772 leads to bottom leaf node 766 in which a prediction is made that the data point under consideration is associated with a foreground object with a degree of confidence C9. Branch 774 denotes an outcome that intensity of the first given proximate pixel is not greater than the threshold value $thr_{intensity-2}$. Branch 774 leads to bottom leaf node 768 in which a prediction is made that the data point under consideration is associated with a background object with a degree of confidence C/O.

Intermediate (or inner) leaf node 776 denotes a test for determining whether the intensity of a second given proximate pixel is greater than a threshold value $thr_{intensity-3}$. The threshold value $thr_{intensity-3}$ can be the same or different than threshold value $thr_{intensity-1}$ and/or threshold value $thr_{intensity-2}$. The proximate pixel reference in leaf node 776 can be the same pixel or a different pixel than that referenced in leaf node 764. Branch 784 denotes an outcome that the intensity of the given proximate pixel is greater than the threshold value $thr_{intensity-3}$. Branch 784 leads to bottom leaf node 778 in which a prediction is made that the data point under consideration is associated with a foreground object with a degree of confidence C11. Branch 786 denotes an outcome that the intensity of the given proximate pixel is not greater than the threshold value $thr_{intensity-3}$. Branch 786 leads to bottom leaf node 780 in which a prediction is made that the data point under consideration is associated with a background object with a degree of confidence C12. The confidence values C9, C10, C11 and/or C12 can be the same as each other or different from each other.

When the decision tree 704 provides a prediction that the data point under consideration is associated with a foreground object, a value of a parameter $P_{704}$ may be set to first number (e.g., one). In contrast, the value of $P_{704}$ may be set to a second different number (e.g., zero) when the decision tree 704 provides a prediction that the data point under consideration is associated with a background object. The confidence value C9, C10, C11 or C12 and the value of parameter $P_{704}$ will subsequently be used by the system to make a final decision as to whether the data point under consideration is associated with a foreground object or a background object.

In some scenarios, the final decision F is made in accordance with the following mathematical equation (5).

$$F=((C_{700}*f_{700})+(C_{702}*f_{702})+(C_{704}*f_{704}))/3 \quad (5)$$

where $C_{700}$ represents the confidence value output from decision tree 700 (i.e., $C_1$, $C_2$, $C_3$ or $C_4$), $C_{702}$ represents the confidence value output from decision tree 702 (i.e., $C_5$, $C_6$, $C_7$ or $C_8$), and $C_{704}$ represents the confidence value output from decision tree 704 (i.e., $C_9$, $C_{10}$, $C_{11}$ or $C_{12}$). A final classification that the data point currently under consideration is a foreground data point is made when (i) a majority of the decision trees (e.g., 2 in this scenario) made a foreground predication and (ii) F is equal to or greater than a threshold value $thr_{final}$ (e.g., 0.5). A final classification that the data point currently under consideration is a background data point is made when (i) a majority of the decision trees (e.g., 2 in this scenario) made a background predication and (ii) F is less than a threshold value $thr_{final}$ (e.g., 0.5).

The hierarchical decision tree classifier may also perform operations to group data points together to form point cloud segments based on the data point classifications and/or distances between data points. In some scenarios, all data points classified as foreground data points are grouped together to form a first point cloud segment, and all data points classified as background data points are grouped together to form a second point cloud segment. In other scenarios, data points classified as foreground data points are grouped together based on distances between each other so as to form one or more foreground point cloud segments, and data points classified as background data points are grouped together based on distances between each other so as to form one or more background point cloud segments. The present solution is not limited to the particulars of these scenarios. Other techniques can be used to group classified data points.

The hierarchical decision tree classifier is trained based on feature vectors derived using point clouds generated based on stereo images. Feature vectors are well known. Techniques for deriving feature vectors are well known. Each feature vector includes, but is not limited to, the following information for a given pixel under consideration and S (e.g., 25) proximate pixels: a foreground/background classification, an intensity value, a position, and a delta value (i.e., height above ground). S is an integer. The value of S can be randomly selected, arbitrarily selected, and/or pre-defined. The training produces more accurate foreground/background prediction models at a slow computational speed when a greater value of S is employed, and produced less accurate foreground/background prediction models at a faster computation speed when a smaller value of S is employed. Thus, the selection of S is a trade-off between model accuracy and computational speed.

The feature vectors are used to train the hierarchical decision tree classifier in accordance with a known or to be known training technique. One such training technique that can be used here is the well-known Python technique that (i) finds patterns within the feature vectors for foreground objects and background objects, (ii) defines the patterns in hierarchical decision tree structures, and (iii) defines machine learned models for foreground/background predication using the hierarchical decision tree structures. Each machine learned model comprises a plurality of hierarchical decision tree structures.

For example, in some scenarios, a 3D road map is used during the training to determine a plurality of distances between data points in point clouds. Each distance comprises a distance between a given data point to each of a plurality of data points associated with nearby pixels in a stereo image plane. The distances are used to (i) detect patterns of distances between data points that are likely to indicate objects in the foreground or background, and (ii) determine how many nearby pixels are to be used to estimate foreground/background objects as a function of distance. The learned information (i) and (ii) is stored in a datastore and used to generate machine learned models.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:
1. A method for object detection, comprising:
obtaining, by a computing device, a plurality of intensity values denoting at least a difference in a first location of at least one object in a first image and a second location of the at least one object in a second image;

converting, by the computing device, the intensity values to 3D position values;

inputting, by the computing device, the 3D position values and the intensity values into a classifier algorithm to obtain classifications for data points of a 3D point cloud, each of the classifications comprising a foreground classification or a background classification; and using, by the computing device, the classifications to detect at least one object which is located in a foreground or a background.

2. The method according to claim 1, further comprising using the classifications to control operations of an autonomous vehicle.

3. The method according to claim 1, wherein the plurality of intensity values is obtained from a stereo disparity image that is generated based on the first and second images captured concurrently by stereo cameras.

4. The method according to claim 1, wherein each of the intensity values denotes a position difference between coordinates of a pixel in the first image and coordinates of a corresponding pixel in the second image.

5. The method according to claim 1, wherein each of the intensity values denotes a distance between a pixel of the first or second image and a location of a camera that captured the first or second image.

6. The method according to claim 1, wherein the converting comprises projecting each of said intensity values into an xyx-position in a 3D road map.

7. The method according to claim 6, wherein the projecting is based on a time of image capture, a location of a vehicle at the time of image capture, positions of cameras relative to the vehicle, pixel pointing directions, and distances of the pixels from the cameras.

8. The method according to claim 1, wherein the classifier algorithm comprises a hierarchical decision tree classifier.

9. The method according to claim 1, further comprising estimating a height of each said 3D position value from ground using a 3D road map and inputting the estimated heights into the classifier algorithm along with the 3D position values.

10. The method according to claim 1, wherein each of the intensity values comprises a scalar value.

11. A system, comprising:

a processor; and a non-transitory computer-readable storage medium comprising programming instructions that are configured to cause the processor to implement a method for object detection, wherein the programming instructions comprise instructions to:

obtain a plurality of intensity values denoting at least a difference in a first location of at least one object in a first image and a second location of the at least one object in a second image;

convert the intensity values to 3D position values;

input the 3D position values and the intensity values into a classifier algorithm to obtain classifications for data points of a 3D point cloud, each of the classifications comprising a foreground classification or a background classification; and use the classifications to detect at least one object which is located in a foreground or a background.

12. The system according to claim 11, wherein the programming instructions comprise instructions to use the classifications to control operations of an autonomous vehicle.

13. The system according to claim 11, wherein the plurality of intensity values is obtained from a stereo disparity image that is generated based on the first and second images captured concurrently by stereo cameras.

14. The system according to claim 11, wherein each of the intensity values denotes a position difference between coordinates of a pixel in the first image and coordinates of a corresponding pixel in the second image.

15. The system according to claim 11, wherein each of the intensity values denotes a distance between a pixel of the first or second image and a location of a camera that captured the first or second image.

16. The system according to claim 11, wherein the converting comprises projecting each of said intensity values into an xyx-position in a 3D road map.

17. The system according to claim 16, wherein the projecting is based on a time of image capture, a location of a vehicle at the time of image capture, positions of cameras relative to the vehicle, pixel pointing directions, and distances of the pixels from the cameras.

18. A non-transitory computer-readable medium that stores instructions configured to, when executed by at least one computing device, cause the at least one computing device to perform operations comprising:

obtaining a plurality of intensity values denoting at least a difference in a first location of at least one object in a first image and a second location of the at least one object in a second image;

converting the intensity values to 3D position values;

inputting the 3D position values and the intensity values into a classifier algorithm to obtain classifications for data points of a 3D point cloud, each of the classifications comprising a foreground classification or a background classification; and using the classifications to detect at least one object which is located in a foreground or a background.

* * * * *